United States Patent
Rodgers

(10) Patent No.: US 9,448,633 B2
(45) Date of Patent: Sep. 20, 2016

(54) MOVING A DISPLAY OBJECT WITHIN A DISPLAY FRAME USING A DISCRETE GESTURE

(75) Inventor: Michael Patrick Rodgers, Aurora, CO (US)

(73) Assignee: Oracle International Corporation, Redwood Shores, CA (US)

( * ) Notice: Subject to any disclaimer, the term of this patent is extended or adjusted under 35 U.S.C. 154(b) by 681 days.

(21) Appl. No.: 13/460,425

(22) Filed: Apr. 30, 2012

(65) Prior Publication Data

US 2013/0083037 A1 Apr. 4, 2013

Related U.S. Application Data

(60) Provisional application No. 61/542,186, filed on Oct. 1, 2011.

(51) Int. Cl.
| | | |
|---|---|---|
| *G06T 13/80* | (2011.01) | |
| *G06F 3/0481* | (2013.01) | |
| *G06F 3/0488* | (2013.01) | |
| *G06F 3/01* | (2006.01) | |

(52) U.S. Cl.
CPC .............. *G06F 3/017* (2013.01); *G06F 3/0481* (2013.01); *G06F 3/04883* (2013.01); *G06T 13/80* (2013.01)

(58) Field of Classification Search
CPC .............................. G06F 3/0481; G06F 3/017
See application file for complete search history.

(56) References Cited

U.S. PATENT DOCUMENTS

| | | | | |
|---|---|---|---|---|
| 3,752,522 A | * | 8/1973 | Speer | ............................. 293/134 |
| 6,708,142 B1 | | 3/2004 | Baillot et al. | |
| 2006/0158459 A1 | * | 7/2006 | Ferguson et al. | ............. 345/619 |

(Continued)

FOREIGN PATENT DOCUMENTS

| | | |
|---|---|---|
| CN | 101390037 A | 3/2009 |
| CN | 101950235 A | 1/2011 |
| CN | 102099766 A | 6/2011 |

OTHER PUBLICATIONS

Fluid Friction ( http://hyperphysics.phy-astr.gsu.edu/hbase/airfri.html Archived on Dec. 11, 2000. Retrieved on Aug. 28, 2015 from <https://web.archive.org/web/20001211074100/http://hyperphysics.phy-astr.gsu.edu/hbase/airfri.html>).*

(Continued)

*Primary Examiner* — Zhengxi Liu
(74) *Attorney, Agent, or Firm* — Vista IP Law Group, LLP; Peter Mei

(57) ABSTRACT

A method, system, and computer program product for moving objects such as a display window about a display frame by combining classical mechanics of motion. A window nudging method commences by receiving a discrete user interface gesture from a human interface device such as a mouse click or a keystroke, and based the discrete user interface gesture, instantaneously accelerating the window object to an initial velocity. Once the window is in motion, then the method applies a first animation to animate the window object using realistic motion changes. Such realistic motion changes comprise a friction model that combines sliding friction with fluid friction to determine frame-by-frame changes in velocity. The friction model that combines sliding friction with fluid friction can be applied to any object in the display frame. Collisions between one object and another object or between one object and its environment are modeled using a critically-damped spring model.

20 Claims, 12 Drawing Sheets

(56) References Cited

U.S. PATENT DOCUMENTS

| | | | |
|---|---|---|---|
| 2006/0292532 A1* | 12/2006 | Stern | 434/236 |
| 2007/0024627 A1* | 2/2007 | Oka et al. | 345/474 |
| 2008/0222540 A1 | 9/2008 | Schulz et al. | |
| 2008/0234072 A1* | 9/2008 | Seaman | A63B 7/0018 473/397 |
| 2009/0201270 A1* | 8/2009 | Pikkujamsa et al. | 345/184 |
| 2009/0307623 A1* | 12/2009 | Agarawala et al. | 715/765 |
| 2009/0315839 A1 | 12/2009 | Wilson et al. | |
| 2010/0013653 A1 | 1/2010 | Birnbaum et al. | |
| 2010/0306680 A1 | 12/2010 | Quennesson et al. | |
| 2011/0029927 A1 | 2/2011 | Lietzke | |
| 2011/0163944 A1 | 7/2011 | Bilbrey et al. | |
| 2011/0193788 A1 | 8/2011 | King et al. | |
| 2011/0202834 A1 | 8/2011 | Mandryk et al. | |
| 2011/0231797 A1* | 9/2011 | Huhtala et al. | 715/811 |
| 2011/0310029 A1 | 12/2011 | Utterman et al. | |

OTHER PUBLICATIONS

Friction (http://hyperphysics.phy-astr.gsu.edu/hbase/frict.html Archived on Mar. 8, 2000. Retrieved on Aug. 28, 2015 from <https://web.archive.org/web/20000308150137/http://hyperphysics.phy-astr.gsu.edu/hbase/frict.html>).*

Non-final Office Action dated Jul. 3, 2014 for U.S. Appl. No. 13/460,465, 15 pages.

International Search Report and Written Opinion dated Dec. 4, 2012 for PCT/US2012/057645.

Final Office Action dated Jan. 2, 2015 for U.S. Appl. No. 13/460,465.

Extended European Search Report dated Apr. 9, 2015 for corresponding European Patent Application No. 12836671.3, 7 pages.

Non-final Office Action dated Dec. 18, 2015 for related U.S. Appl. No. 13/460,465.

First Chinese Office Action dated Jun. 24, 2016 for corresponding CN Patent Application No. 201280048343.4.

Notice of Allowance and Fee(s) due dated Jul. 1, 2016 for related U.S. Appl. No. 13/460,465.

* cited by examiner

MOVING A DISPLAY OBJECT WITHIN A DISPLAY FRAME USING A DISCRETE GESTURE

RELATED APPLICATIONS

The present application claims the benefit of priority to U.S. Provisional Patent Application Ser. No. 61/542,186, filed Oct. 1, 2011, entitled "NEWTONIAN MOTION FOR USER INTERFACES", hereby incorporated by reference in its entirety; and the present application is related to co-pending U.S. patent application Ser. No. 13/460,465, entitled "MOVING AN OBJECT ABOUT A DISPLAY FRAME BY COMBINING CLASSICAL MECHANICS OF MOTION", filed on even date herewith, which is hereby incorporated by reference in its entirety.

FIELD

The disclosure relates to the field of user interfaces for display screens and more particularly to techniques for moving an object about a display frame.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Some embodiments of the present disclosure are directed to an improved approach for implementing moving an object about a display frame by combining classical mechanics of motion. More particularly, disclosed herein are methods and systems for using realistic animations.

A compelling user interface must provide a degree of continuity, and a compelling user interface must also invite interaction, however, legacy attempts to provide continuity and the invitation for interaction have come at the expense of realism. Thus, there is a need for an improved approach for implementing realistic graphical user interfaces, especially user interfaces that implement realistic animations.

More specifically, the aforementioned technologies do not have the capabilities to perform moving an object about a display frame by combining classical mechanics of motion nor for handling animation of displayable objects (e.g., carousels, maps, photo galleries) whose virtual size is larger than the display surface.

Therefore, there is a need for an improved approach for implementing moving an object about a display frame using realistic animations.

SUMMARY

The present disclosure provides an improved method, system, and computer program product suited to address the aforementioned issues with legacy approaches. More specifically, the present disclosure provides a detailed description of techniques used in methods, systems, and computer program products for moving an object about a display frame by combining classical mechanics of motion.

One application of the present disclosure is advantageously applied in an object animation method for large objects having display content that cannot be conveniently displayed all at one moment in time (such as filmstrips, maps, slide collections, etc). An exemplary method commences by receiving a gesture, the gesture comprising a signal from a human interface device, and determining environmental variables, the environmental variables comprising values such as a strength of the gesture from the human interface device, a height of the display frame, a width of the display frame, and a mass value of the window object, etc, then applying an animation to the window object, based on the mass value, and where the animation comprises calculating the motion of the window object based on the mass value by combining the sliding friction term with the fluid friction term. Collisions (or other modeled interactions) between one object and another object or between one object and its environment are modeled by adding a critically-damped spring model to the combined sliding friction and fluid friction model.

Another application of the present disclosure is advantageously applied in a desktop or laptop windowing environment of an enterprise application system. Such deployments provide a window nudging method, which commences by receiving a discrete user interface gesture (e.g., a nudge) from a human interface device such as a mouse click or a keystroke, and based on the discrete user interface gesture, instantaneously accelerating the window object to an initial velocity. Once the window is in motion, then applying a first animation to animate the window object using realistic motion changes. Such realistic motion changes comprise a friction model that combines sliding friction with fluid friction to determine frame-by-frame changes in velocity. The friction model that combines sliding friction with fluid friction can be applied to any object in the display frame. Collisions between one object and another object or between one object and its environment are modeled using a critically-damped spring model.

Further details of aspects, objectives, and advantages of the disclosure are described below in the detailed description, drawings, and claims. Both the foregoing general description of the background and the following detailed description are exemplary and explanatory, and are not intended to be limiting as to the scope of the claims.

DETAILED DESCRIPTION

Figure 1A:
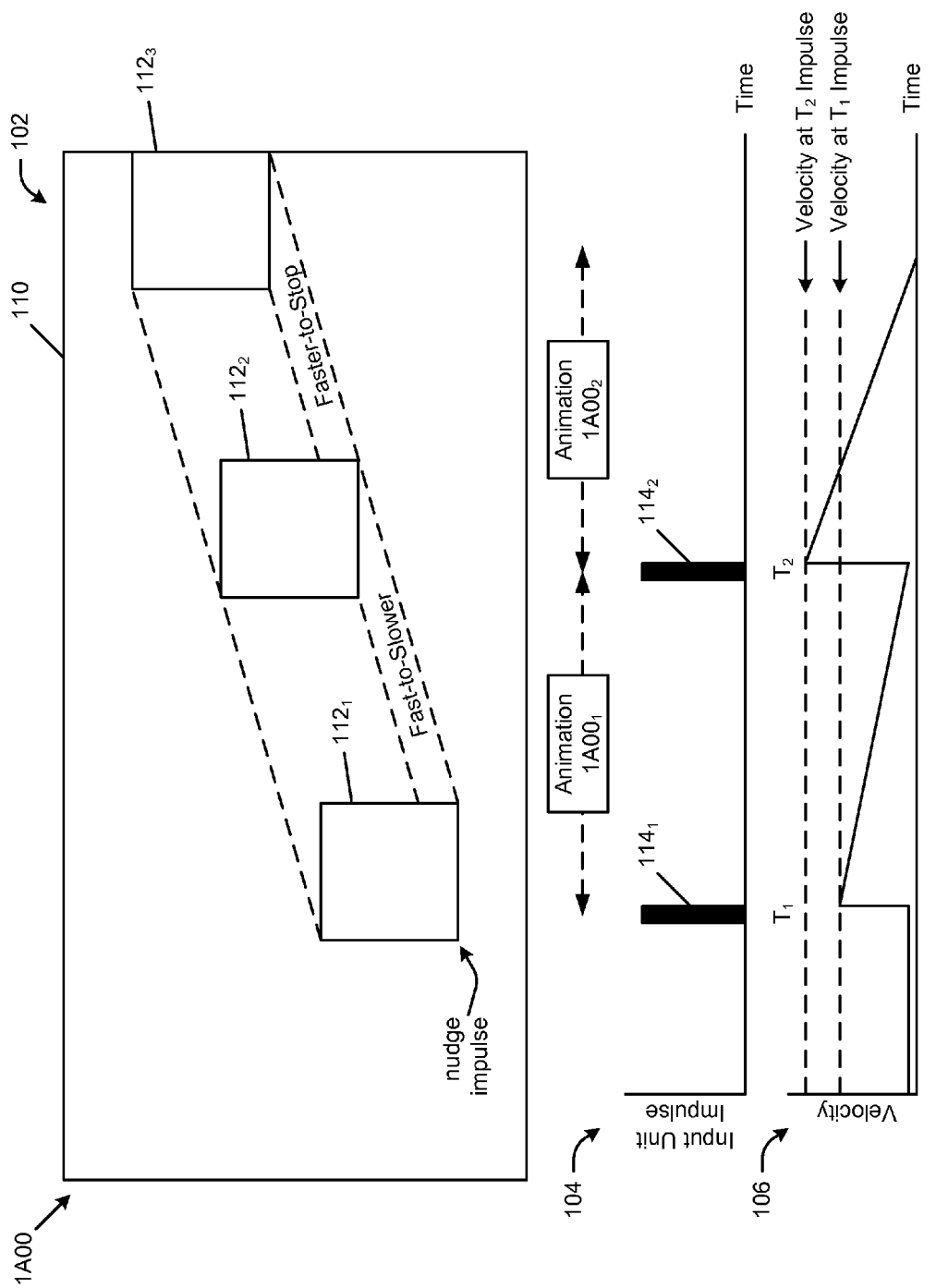
FIG. 1A depicts an object in motion under an animation for moving an object about a display frame by combining classical mechanics of motion, according to some embodiments.

Some embodiments of the present disclosure are directed to an improved approach for implementing moving an object about a display frame by combining classical mechanics of motion. More particularly, disclosed herein are environments, methods, and systems for implementing moving an object about a display frame by combining classical mechanics of motion.

Overview

Compelling user-interfaces provide continuity and realism. Also, a compelling user-interface invites user interaction. Yet, the continuity, realism, and invitation for interaction (e.g., using motion models that the user will regard as realistic) cannot come at the expense of functionality.

In modern user interfaces, there exist many opportunities for realistic motion, such as when there is an object or a set of objects that are too big to be seen at one time on a display surface. Examples of such objects include a carousel, a large map, a photo gallery, etc. Further, it is often more compelling to interact with the object(s) directly, rather than to use a scroll bar. Otherwise stated, users prefer to interact with content directly instead of interacting artificially, such as with an object using a control (e.g., a scroll bar) separate from the content itself. For example, users deem it more natural and realistic to slide a carousel left or right by sliding the content, rather than to use a mouse or other pointing device to touch a scroll bar. Moreover, the lack of realism is exacerbated if the items being moved abruptly stop moving as soon as the user "lets go" (e.g., mouse button up action). Still more, the drop-and-stop interface model becomes harder and harder to use as screen sizes increase, or as the size of content increases such that a user would wish to "travel" a significant distance within the content.

As aforementioned, sometimes the content is too large to see the entire content at once. One possible technique to partially address this case is to use a viewport within a window object, such that only a portion of the content is visible on the screen at any moment in time (e.g., such as a carousel) showing only a few images from among scores (or more) of images that are on the filmstrip under the viewport of the carousel. User interaction with such objects can be facilitated by dragging the contents of the object (e.g., through the viewport) using a traditional mouse or with touch-screen techniques.

However, dragging does not work well in all situations. As examples, dragging does not work well when using (for one example) a laptop that has only a track-pad or eraser-head style mouse, nor does it work well (for another example) on keyboard-only interfaces. In such situations, some technique or techniques using single click (or a key stroke, or touch event, or other similar atomic interaction) to drag or move is desired. Yet, implementation of such techniques presents several problems to solve, such as (1) How far should the object move? The distance that seems appropriate in one situation might not be appropriate in another situation. (2) How fast should the object move? If the object instantly jumps from position A to position B, the user can lose his/her place. Yet, if the object moves gradually, this must be done in a manner that conserves the user's time, and is consistent with a user's expectations. There are still other situations where a distance that seems appropriate in one situation might not be appropriate in another situation; for example, where the amount of content is particularly large (versus small) as compared to the viewport.

The figures and descriptions that follow address the above questions, and address at least some of the deficiencies in legacy implementations.

DESCRIPTIONS OF EXEMPLARY EMBODIMENTS

FIG. 1A depicts an object in motion under an animation for moving an object about a display frame by combining classical mechanics of motion. As an option, the present animation 1A00 may be implemented in the context of the architecture and functionality of the embodiments described herein. Also, the animation 1A00 (e.g., animation $1A00_1$, animation $1A00_2$) within the bounds of a display frame or any aspect therein may be implemented in any desired environment.

As described above, dragging does not work in all situations. The figure and descriptions herein provide a user interface motion model to answer (in a mathematical form) such questions as (1) How far should the object move? (2) How fast should the object move? and (3) How to move the object in a manner that conserves the user's time and does not detract from the user's focus?

FIG. 1A depicts an animation 1A00 comprising a display frame 102 (e.g., a computer monitor screen, a touch screen, a frame buffer, etc.) bounded by a perimeter (e.g., a bound or limit or a bounce periphery 110). Within the perimeter is shown a display object 112 (see the initial location of display object $112_1$, the second location of display object $112_2$, and the third location of display object $112_3$). Also shown in animation 1A00 is an impulse input time series graph 104, and a velocity as a function of time graph 106. As shown, an impulse nudge 114 (e.g., impulse nudge $114_1$, as shown) is delivered to display object (e.g. a window object) at time $T_1$, imparting an initial velocity to display object $112_1$ causing it to travel with that initial velocity to the second location of display object $112_2$. To account for realism in the movement, the initial velocity (see the legend Velocity at $T_1$ Impulse) is imparted to the display object $112_1$, which velocity slows under dampening with time, until (as shown) a second impulse nudge $114_2$ is delivered at time=$T_2$. The impulse nudge delivered at time=$T_2$ increases the velocity (see the legend Velocity at $T_2$ Impulse), which velocity is the same as (or slightly greater than) at time $T_1$. The object slows with time, until coming to rest at the third location of display object $112_3$.

For example, in one specific implementation, giving a second impulse nudge to an object brings the object velocity back to the same velocity value as was achieved by the previous nudge, even if the object is already in motion. In such a case, the maximum achieved velocity is determined by a constant, rather than making the magnitude of the impulse determined by a constant.

Some embodiments rely on selection of an initial virtual energy or initial velocity to impart to a display object upon an input impulse nudge. That is, a user would expect realistic motion regardless of whether the screen is a large screen or a small screen. In some embodiments, a fixed-energy impulse value might be imparted. However, whatever fixed-energy impulse value might be selected can be too small on a big screen (e.g., requiring excessive additional clicks) and can be too big on a small screen (e.g., overshooting dramatically).

One approach is to select a particular energy impulse (e.g., a impulse nudge 114) that would impart sufficient virtual momentum to the object to carry the object to 85% of the distance from the object to the bounce periphery, calculating for the velocity slowing (and stopping) under dampening. In some use cases, the 85% value is an optimal value when it means that the user can maintain context during the animation. For example, if the user is panning to the right on a map, the right-most 15% of the map (e.g., before the nudge) is still visible (now on the left) after the nudge. This lets the user see a great deal of new content but provides enough context such that the user does not to lose track of "where" he or she is.

The particular energy impulse can be calculated as a function of the size of the viewport, the size or mass of the content, and possibly other model-driven factors as well.

In another embodiment, the user might desire to move an object a very long distance. To move an object very large distances the user can click repeatedly. Each time the user clicks, the energy of an impulse (e.g., an impulse nudge 114) is delivered to the content, and the content changes velocity in accordance with the energy imparted via the nudge, and damped so as to come to rest within the bounds of the bounce periphery. So long as the user continues to nudge (e.g., using a click or keystroke), the content will change velocity in accordance with the energy imparted via the nudge. Once the user stops applying additional nudges, the object will quickly but smoothly come to a stop. In one implementation, when an object travels to a position infinitesimally close to an edge (e.g., 1px-2px), the GUI control to initiate a nudge is disabled (e.g., grayed out or hidden) so that no further nudge(s) can be initiated from the current position. In another case, a nudge will cause the object to overshoot and then spring back using the damped spring paradigm as disclosed herein.

Other models can be applied as well, for example, a model where a particular calculated resultant velocity is imparted to the object immediately after a nudge. Or, one alternative implementation would be for the energy imparted via the nudge to be exactly what is necessary to bring the content to a particular position (e.g., to the edge).

In some implementations the calculations for determining the energy of a nudge (or a particular calculated resultant velocity) and calculations pertaining to dampening can be codified using a library that includes a variety of "impulse" functions, possibly including combining multiple impulse functions into library facilities. Strictly as examples, the following techniques can be codified into functions in a library and used in an animation:

When an initial impulse is delivered to the object; the object moves, and then slows under a classical mechanics model involving a mass value, acceleration, energy transfer, and energy loss (e.g., following Newtonian mechanics).

When an initial impulse is delivered to the object; the object moves, and then slows under a classical mechanics model involving a mass value, acceleration, energy, and friction. The friction can include mechanics of static sliding friction, kinetic sliding friction, and mechanics of fluid friction, etc.

When an initial impulse is delivered to the object; the object moves, and then slows under a classical mechanics model involving a mass value, acceleration, energy, and fluid friction.

When there is a sudden change in momentum (e.g., bumping into a bounce periphery or bumping into another object), the motion response is consistent with an inelastic collision, or a striking action. That striking action is analogous to striking a mouse button (single click). Similarly, gestures from a human interface device (e.g., transducers such a mouse button or key on a keyboard) are sudden (and not gradual). Examples include a mouse click or a keystroke, or a discrete touch gesture, and such a discrete event (e.g., discrete gesture) result in an analogous motion response (e.g., a sudden impulse nudge).

A library function that serves to model the magnitude of an impulse nudge as a function of the screen size. In one case, the impulse nudge is calculated to deliver an impulse nudge force that is necessary to cause the total distance traveled (under the impulse nudge, under the friction model, etc.) to be a fixed percentage (e.g., 85%) of the width (if it is a horizontal motion) or height (for a vertical motion) of the display frame 102.

A library function that serves to model the magnitude of an impulse nudge as a function of the screen distance from the object to the bounce periphery. In one case, the impulse nudge is calculated to deliver an impulse energy that is necessary to cause the object to travel a fixed percentage (e.g., 100%) of the distance to a vertical bounce periphery (if it is a horizontal motion) or cause the object to travel a fixed percentage (e.g., 100%) of the distance to a horizontal bounce periphery (for a vertical motion).

Figure 1B:
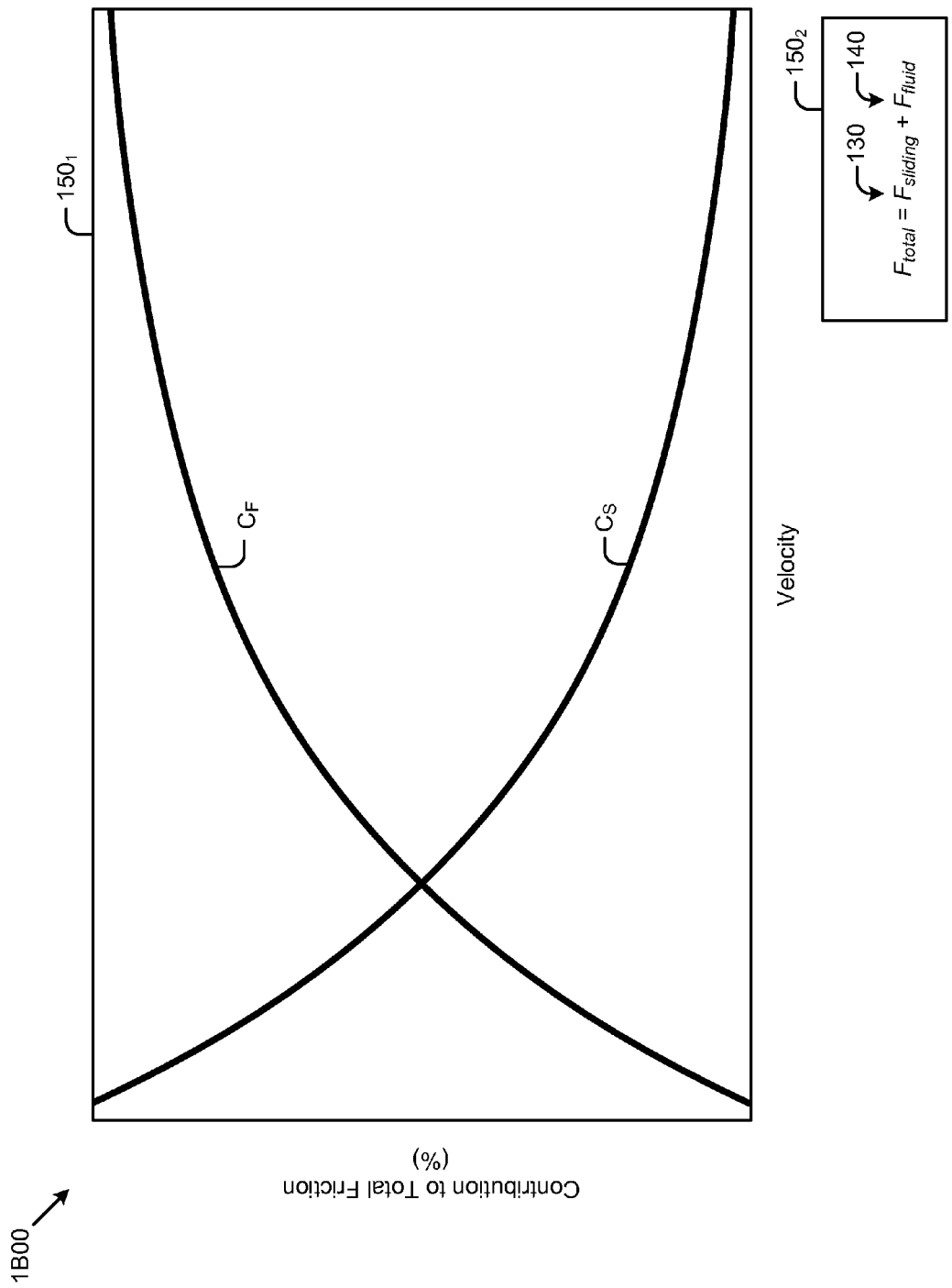
FIG. 1B depicts representations of a sum of forces regime for moving an object about a display frame by combining classical mechanics of motion, according to some embodiments.

FIG. 1B depicts representations of a sum of forces regime for moving an object about a display frame by combining classical mechanics of motion. As an option, the present sum of forces regime 1B00 may be implemented in the context of the architecture and functionality of the embodiments described herein. Also, the sum of forces regime 1B00 used in object animation or any aspect therein may be implemented in any desired environment.

Some user interface models impart velocity to an object in response to user input. However legacy models have deficiencies to be addressed, such as Legacy models can slow to a halt too quickly (e.g., jarring behavior).

Legacy models can slow to a halt too slowly (e.g., sluggish behavior).

Legacy models observe fixed bounds which, when exceeded, cause some screen real-estate to be wasted. For example if the content to be viewed is wider than the viewport, then the overshooting (e.g., some portion of the content exceeding the bounds of the viewport)

should be adjusted (e.g., by adjusting the position of the content) to show as much as possible of the content. Techniques to adjust the position of the content using damping are disclosed herein.

A hard stop (jarring) or slow impartation of velocity (sluggish) can be unrealistic to the point of being annoying.

Bouncing (especially, as in bouncing in an environment with "hard" inelastic collisions) can cause the object to end up somewhere other than where the user expected, and legacy techniques that handle overshooting by bouncing back are disorienting to the user.

Legacy models can be unrealistic in many other behaviors.

Accordingly, a technique that address the above (and other) deficiencies, and that results in aesthetically-pleasing motion behaviors is given in the sum of forces regime 1B00. Referring again to classical mechanics of motion, an "object" in motion (e.g., an object having a mass value) moves at a constant velocity until acted upon by a force or forces. The sum of forces regime 1B00 as shown includes a friction model 150 (e.g., the friction model $150_1$ shown as a chart, or the friction model $150_2$ shown as an algebraic equation) that calculates the sum of forces from a sliding friction model combined with the forces from a fluid friction model.

In accordance with a sliding friction model (e.g., kinetic friction model), an object loses kinetic (movement) energy due to friction as it slides along a surface. In realistic (e.g., Earth-bound) settings, the friction is proportional to the forces that are normal to the surface; for example, the forces present due to the (virtual) weight of an object (e.g., a virtual object). Such a force (see $F_{normal}$, below) is modeled as being proportional to the mass of the object. Thus an object with an initial sliding velocity will come to rest when the kinetic energy of the object is lost to the sliding friction.

Exemplary embodiments use a friction model $150_2$ incorporating both a sliding friction term 130 (e.g., a sliding friction function) and a fluid friction term 140 (e.g., a fluid friction function). In some cases, a model for friction can be given by:

$$F_{net}=F_{flui}+F_{sliding} \quad \text{(Eq. 1)}$$

Or, in another form:

$$F_{total}=-(k_{fluid}*V+F_{normal}k_{sliding}\text{sign}(v)) \quad \text{(Eq. 2)}$$

where:

$k_{fluid}$=the strength of fluid friction acting on the object. A positive value is expected, whereas a zero value would mean there is no fluid friction;

$k_{sliding}$=the strength of sliding friction on the object. A positive value is expected, whereas a zero value would mean there is no sliding friction;

$F_{normal}$=the normal force, generally due to gravity, between the object and the surface along which it is sliding; and sign($v$)=1 if $v>0$, 0 if $v$ is =0, and −1 if $v<0$.

The term $F_{sliding}$ in Eq. 1 can be expanded to:

$$F_{sliding}=(F_{normal})*(-K_{sliding})*\text{sign}(v)$$

where:

$F_{normal}$=the normal or perpendicular force between the object and the surface that it is sliding along. In some models, the $F_{normal}$ force is the weight of the object due to gravity. A positive value is expected. A zero value would cause the sliding friction contribution to the quantity $F_{total}$ to be zero.

In many cases, $F_{normal}$ can be a constant value, and for the time period in which the object's velocity is changing continuously from some initial value to zero without passing zero, sign($v$) will also be constant; accordingly, in such situations, it is possible to replace the entire fluid friction term with a single constant $k_{sliding}$ that amalgamates the true constant $k_{sliding}$, the normal force $F_{normal}$, and the sign term sign($v$).

The friction terms (e.g., sliding friction term 130 and fluid friction term 140) in the above equations come from the aforementioned motion mechanics, and can be distinguished as follows:

Fluid friction is proportional to velocity (see the first term on the right side of equation 1) and therefore the fluid friction dominates at high speeds but has little effect at low speeds. Accordingly, a model using only fluid friction will initially decelerate quickly from a high initial velocity, but it will linger for an unrealistically long time at low speeds and take a long time to come to rest.

Static friction is a fixed constant and dominates at low speeds but has little effect at high speeds. A model using only static friction will take a long time to slow down when the initial velocity is fast. To handle high velocities, the coefficient of sliding friction might be very high and causes the object(s) to halt very abruptly leading to jarring, and unrealistic motion behaviors.

By combining both a fluid friction term and a static friction term, it is possible to create a realistic experience (because it comports with everyday Earth-bound physics) that handles an initial release of the object when it is traveling at any speed.

Now, referring again to the sum of forces regime 1B00, and contrasting the sliding friction model with the fluid friction model, the sliding friction model acts most strongly on an object that is at low velocity (or at rest), whereas the fluid friction model acts most strongly on an object that is at high velocity. Combining the effects of a fluid friction model with the effects of a sliding friction model produces a pleasing and seemingly realistic model for motion when moving an object about a display frame at any speed of motion.

The sum of forces in regime 1B00 models the contribution (e.g., forces) from the fluid friction model with respect to the sliding friction model as a function of velocity. For example, and referring to the curve $C_S$, and curve $C_F$, the percent of contribution from the fluid friction model (e.g., L %) with respect to the percent of contribution from sliding friction model (e.g., S %) is given over the range of velocities. As shown, the of percent contribution from the fluid friction model is initially low (e.g., at low velocities) with respect to the sliding friction model, and this relationship is reversed over the range of velocities, with the forces from the fluid friction model increasing with velocity, and eventually dominating at the higher velocities.

As earlier indicated, a model for friction can be given by:

$$F_{net}=F_{sliding}+F_{fluid}$$

Or, in another form:

$$F_{total}=S\%(F_{sliding})+L\%(F_{fluid})$$

where S %+L %=100%.

Figure 1C:
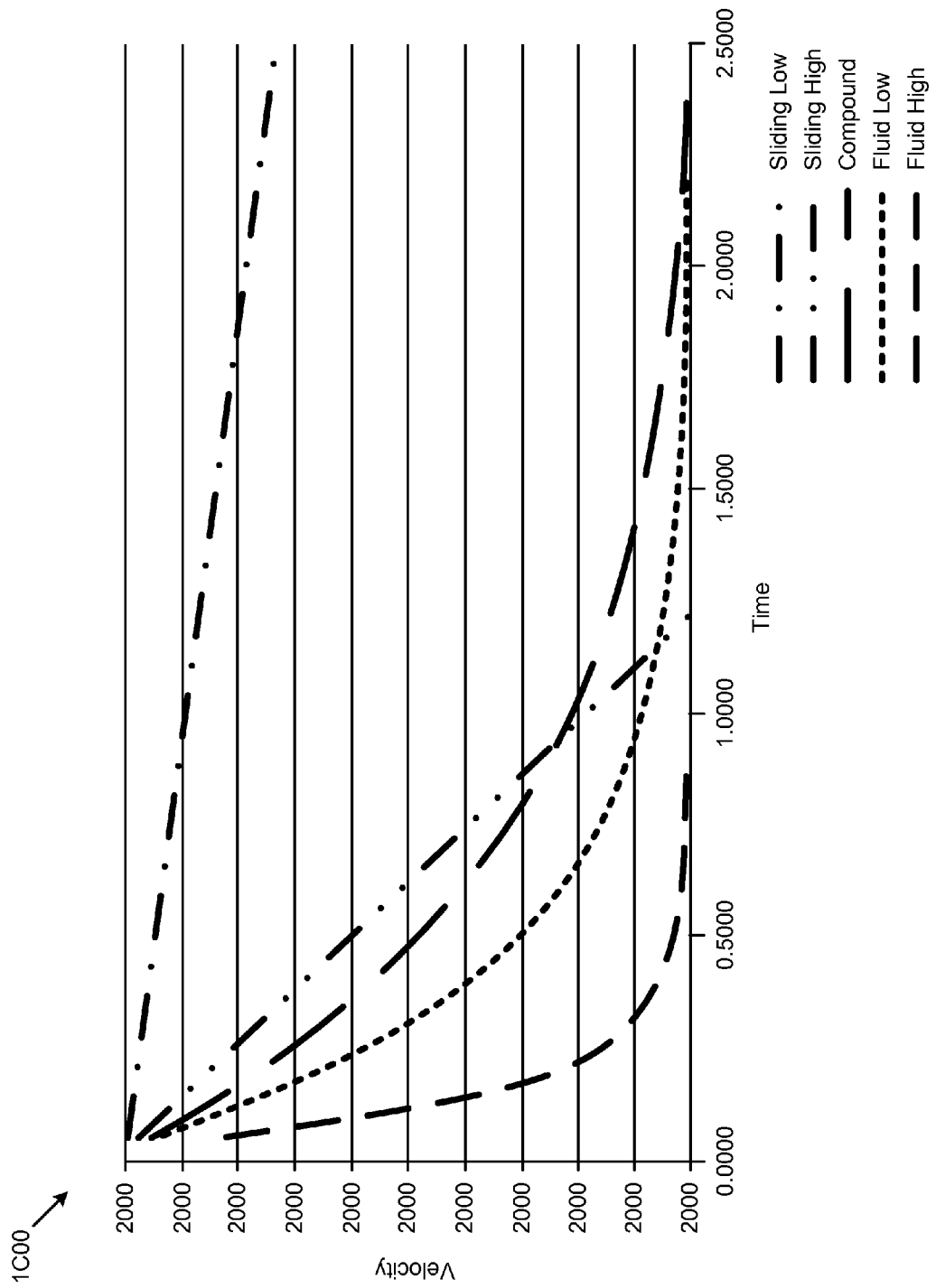
FIG. 1C depicts representations of a sum of forces regime for moving an object about a display frame by combining classical mechanics of motion, according to some embodiments.

FIG. 1C depicts curve representations 1C00 of a sum of forces regime for moving an object about a display frame by combining classical mechanics of motion. The chart shown gives curves that plot velocity as a function of time based on the sums of forces. As shown, there are many possible curves, depending on rate of exponential decay and magnitude of slope and other variables and constants. As shown, the curves fit the equation $v(t)=v_0 e^{-at}-bt$ where $v_0$ is initial velocity and a and b are constants pertaining to the fluid/exponential portion and the sliding/linear portion, respectively. As earlier suggested, the improvements herein overcome legacy models, namely, legacy models that incorporate only sliding friction. To accommodate such models, at even moderate initial velocities (let alone high initial velocities), the coefficient would need to be very large for the object to stop in a timely fashion. However, such a coefficient of friction causes unrealistically fast and abrupt deceleration from smaller initial velocities. It might be possible to achieve realistic deceleration at low speeds (e.g., using a low coefficient of sliding friction), but the object would take a very, very long time to decelerate when initial velocity is high.

Again, as earlier suggested, the improvements herein overcome legacy models, namely, legacy models that incorporate only fluid friction. Because fluid friction is proportional to velocity, it is stronger at higher velocities. However, fluid friction causes the object to linger unrealistically long at low speeds. And, using only fluid friction, the object spends too long barely moving at these low speeds.

A compound friction model (e.g., using both sliding friction and fluid friction) works well because fluid friction dominates at high speeds (causing realistic deceleration for the first part of the slowing), and sliding friction dominates at slow speeds (causing realistic deceleration for the final part of the slowing). Furthermore, it is possible to select coefficients that model the contributions of fluid and sliding friction to the behavior of an object.

It is possible to combine fluid and sliding friction in other ways. For instance, instead of summing non-zero contributions from the fluid friction model or sliding friction model it is possible that during a particular time window of behavior, contributions from only one model or another are non-zero.

Figure 2:
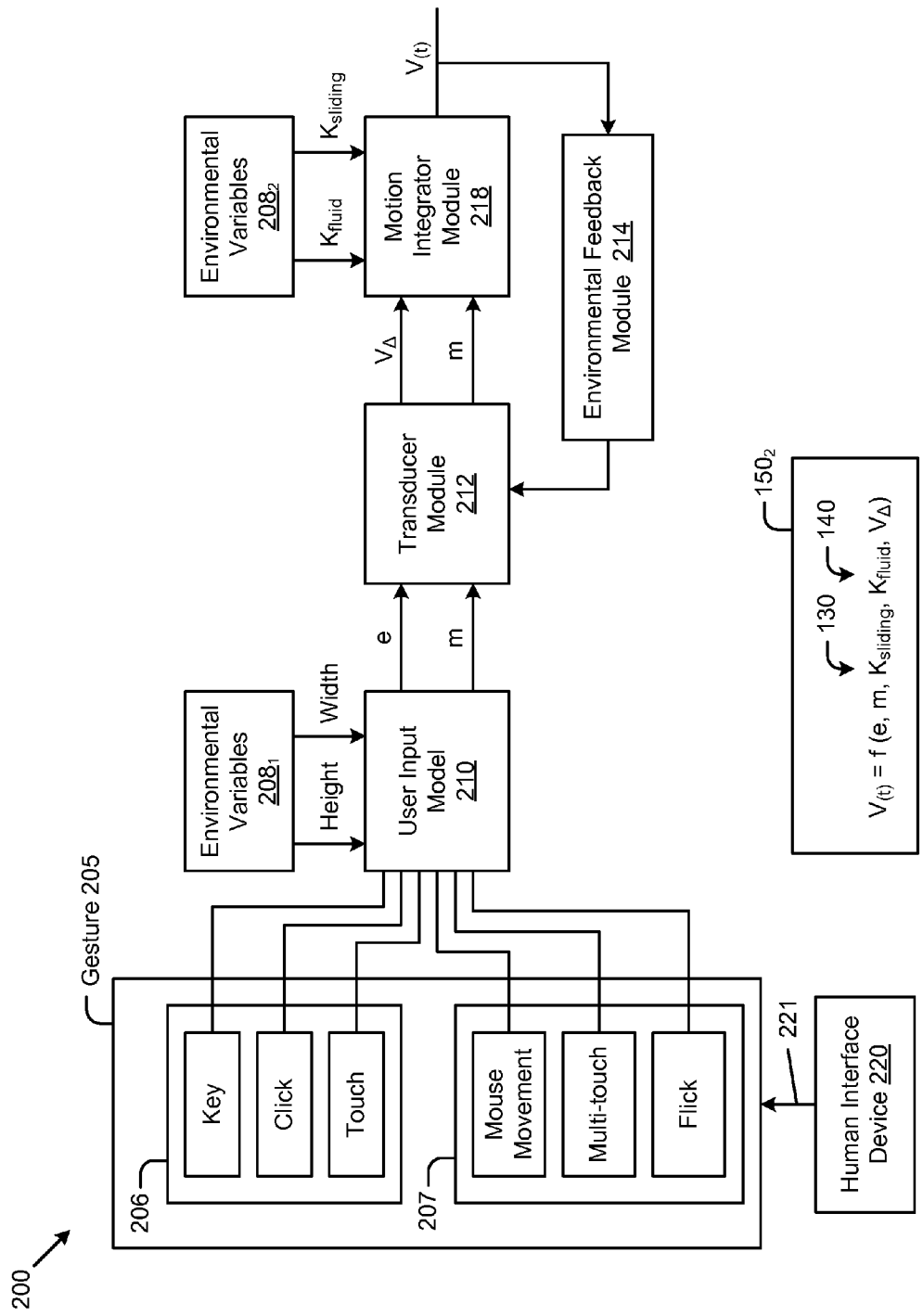
FIG. 2 depicts block diagram of a system for moving an object about a display frame by combining classical mechanics of motion, according to some embodiments.

FIG. 2 depicts block diagram of a system for moving an object about a display frame by combining classical mechanics of motion. As an option, the present system 200 may be implemented in the context of the architecture and functionality of the embodiments described herein. Also, the system 200 or any aspect therein may be implemented in any desired environment.

For implementing a model for combining classical mechanics of motion in desktop applications or in web applications, it is convenient to use an integrator model. FIG. 2 illustrates integrator model for motion, according to some embodiments. Strictly as an example, a model such as depicted in system 200 can comprise multiple motion models, including multiple friction models (e.g., friction model 150), and multiple ways of combining mechanics. As shown, both fluid friction and sliding friction (e.g., static friction or kinetic friction) can be combined.

Traversing the flow through the system 200, a user provides some user input via a human interface device 220 that provides a human interface device signal 221 that in turn serves to form a gesture 205. A gesture can be a discrete gesture 206 (e.g., a keystroke, a click, or a screen touch) or a continuous gesture 207 (e.g., a mouse movement, or a multi-touch, a flicking gesture, etc.), and such a gesture is delivered to the user input model 210. The user input model receives the gesture and combines the gesture with environmental variables $208_1$ such as screen height and screen width (as shown) to determine outputs in the form or numeric quantities for energy (e.g., energy to impart to an object) and a mass value (e.g., the assigned a mass value of an object, the assigned a mass value of an impulse nudge from a gesture, etc.).

The user input model 210 considers the environmental variables 208, (e.g., (e.g., screen size, object size, signal calibration values, etc.) combined with the gesture input and determines the energy "e" and the mass value "m" to be provided to the transducer module 212. Thus, the transducer module converts forms of energy from the user (e.g., gestures) and a mass value "m" into forms of energy imparted as a velocity of the object to be moved about the display frame. As shown the transducer output is in the form of a change to velocity, which change in velocity can be a small acceleration (say from 100 pixels per second to 101 pixels per second), or the change in velocity can be a large acceleration (say from rest to 100 pixels per second). Also as shown, the change in velocity (denoted as $V_A$) can result from feedback from the environment (see environmental feedback module 214).

Such a change in velocity is provided to a motion integrator module 218. And, the motion integrator module 218 performs calculations based on the given change in velocity in combination with environmental variables (e.g., as provided by an environmental variables block). For example, a display object might bounce off of a bounce periphery 110, the characteristics of which bounce periphery is provided as one of a set of environmental variables $208_2$, and in such a bounce, might lose some energy, and/or experience a change in velocity, potentially including a change in direction of motion. That occurrence might in turn be fed back to the transducer module to account for forms of energy (or loss of energy) from the environment (e.g., due to bounce events) and convert into forms of energy imparted as a velocity of the object to be moved about the display frame.

In addition to the previously-described objects that are moved about the display frame, possibly interacting with other objects or possibly interacting with a bounce periphery 110, it is also possible that display objects are moved under a viewport.

Figure 3:
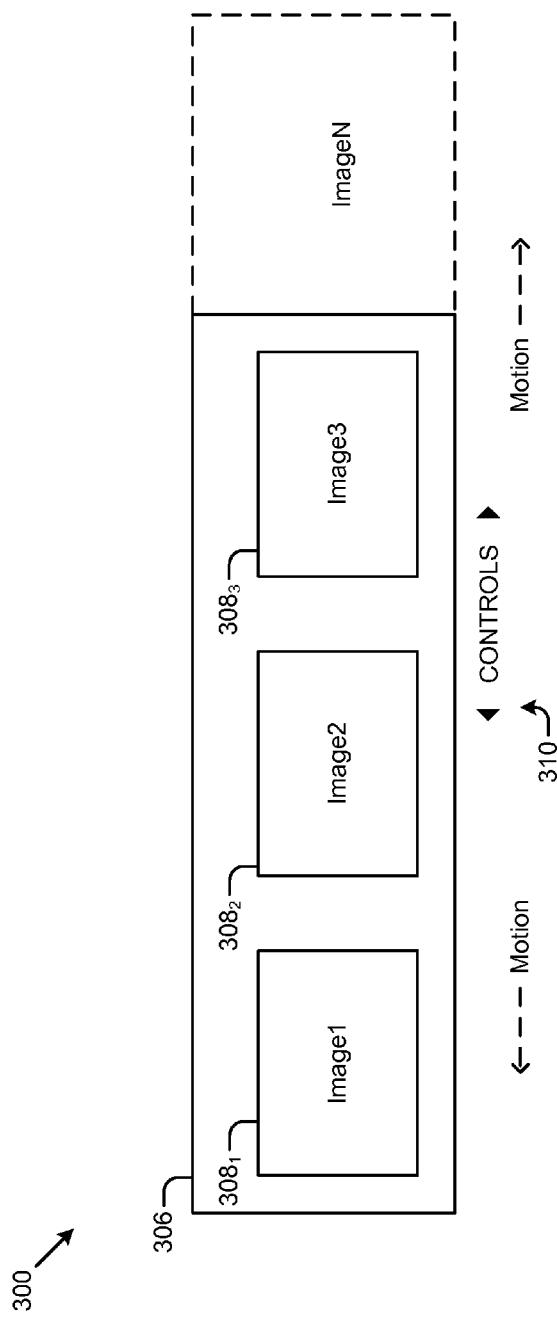
FIG. 3 depicts animation of objects through a viewport within a system for moving an object about a display frame by combining classical mechanics of motion, according to some embodiments.

FIG. 3 depicts animation of objects through a viewport 308 within a system for moving an object about a display frame by combining classical mechanics of motion. As an option, the present carousel 300 may be implemented in the context of the architecture and functionality of the embodiments described herein. Also, the carousel 300 or any aspect therein may be implemented in any desired environment.

As shown, FIG. 3 illustrates a carousel type viewport with motion controls, according to some embodiments. Strictly as an example, the carousel uses techniques for moving object about a display frame by combining classical mechanics of motion.

As earlier indicated, legacy approaches use clicks in a control icon 310 in order to move the film strip individual image by individual image (e.g., individual image $308_1$, individual image $308_2$, individual image $308_3$, etc.) under the viewport 306. Similarly, some other legacy approaches use clicks in such control icons to move the film strip some other fixed distance that is not exactly equal to the distance required for one image. And other legacy approaches use dragging gestures (e.g., a mouse motion with mouse button down) to move the film strip individual image by individual image such that successive next individual images are displayed through the viewport. However, clicking a control icon, or mouse dragging techniques, do not work in all situations. As examples, dragging a film strip does not work well when using (for one example) a laptop that has only a track-pad or eraser-head style mouse, nor does it work well (for another example) on keyboard-only interfaces. In such situations, some technique or techniques using single click (or key stroke) to drag or move is desired.

Yet, implementation of such techniques presents several problems to solve, such as: (1) When using a discrete gesture 206, how many individual images should move in response to the discrete gesture? (2) When using a discrete gesture 206, how fast should the filmstrip move? If the filmstrip instantly jumps from position A to position B, the user can lose his/her place. Yet, if the object moves gradually, this must be done in a manner that conserves the user's time, and is consistent with a user's expectations.

Functions such as presented in system 200 include environmental variables, which in turn can include environmental scenarios having initial velocities and times to come to rest, and/or calculate total distances to be traveled (e.g., number of individual images to advance, and at what rate, and when to slow, and when to stop, etc.). Such functions can include acceleration curves, such as are presented below.

Figure 4:
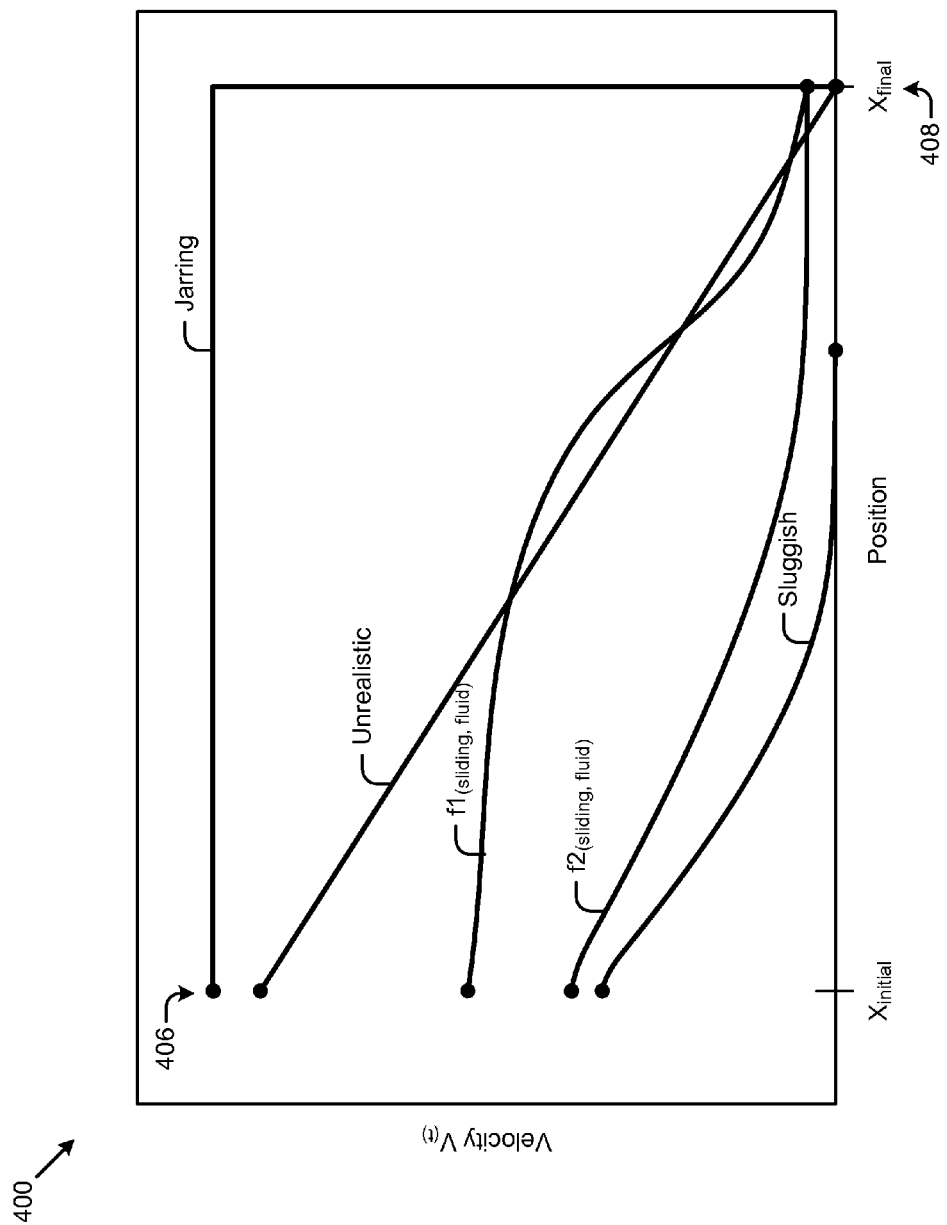
FIG. 4 shows the change in velocity of an object on a graph showing multiple regimes for moving an object about a display frame by combining classical mechanics of motion, according to some embodiments.

FIG. 4 shows the change in velocity of an object on a graph showing multiple regimes for moving an object about a display frame by combining classical mechanics of motion. As an option, the present graph showing multiple regimes 400 may be implemented in the context of the architecture and functionality of the embodiments described herein. Also, the graph showing multiple regimes 400 that can be implemented in systems or any aspect therein may be implemented in any desired environment.

Functions, such as presented in system 200 include environmental variables, which in turn can include environmental scenarios having initial velocities 406, terminal velocities 408, and deceleration curves (e.g., f1 (sliding, fluid), f2 (sliding, fluid)) for traversing from an initial velocity to a terminal velocity 408 over a distance interval. There are many paths for traversing from an initial velocity to a terminal velocity 408 over a distance interval, and the graph showing multiple regimes 400 depicts but a few. As examples, the graph showing multiple regimes 400 depicts a "sluggish" deceleration curve that suffers from too low of an initial velocity, and quickly decelerates to a very slow velocity as the object approaches $X_{final}$ (but may be so sluggish so as to not actually reach $X_{final}$). Another curve, labeled as "jarring" moves at a constant velocity from $X_{initial}$ to $X_{final}$, and then abruptly stops. Another deceleration curve exhibits movement through a linearly decreasing velocity from $X_{initial}$ to $X_{final}$, which is seen as unrealistic. Yet other curves arise from combining classical mechanics of motion, namely where the velocity changes based on a function that combines sliding friction with fluid friction.

Functions, such as presented in system 200, can include graphs such as described in the preceding paragraphs. Or, functions can include the deceleration curves represented in tables, and can further include tables with initial velocities and times to come to rest, considering real or virtual environmental factors (e.g., a mass value, total distances to be traveled, coefficients for friction, viscosity, surface characteristics, etc.). In some cases, functions include and can be controlled by using a derivation (e.g., first order derivative) of x(t) (distance as a function of time), and/or can include a derivation of motion dx/dt in the interval near $X_{final}$.

Objects whose motion is calculated by combining classical mechanics of motion are regarded as providing comfortable and realistic motion. As further examples, should a user desire to move an object a small distance, then the user gives input in the form of a gentle flick. Or, should the user desire to move an object a large distance, then the user gives a sharp flick. In either case, because the content moves smoothly, the user does not lose his or her place.

The aforementioned gentle flick is but one possibility of a gesture, and can be distinguished from a sharp flick by aspects of the gesture. For example, a gentle flick can be determined by the duration of time between the mouse button down and the mouse button up. Or, a gentle flick can be determined by the duration of time between the key pressed down and the key released up.

Figure 5:
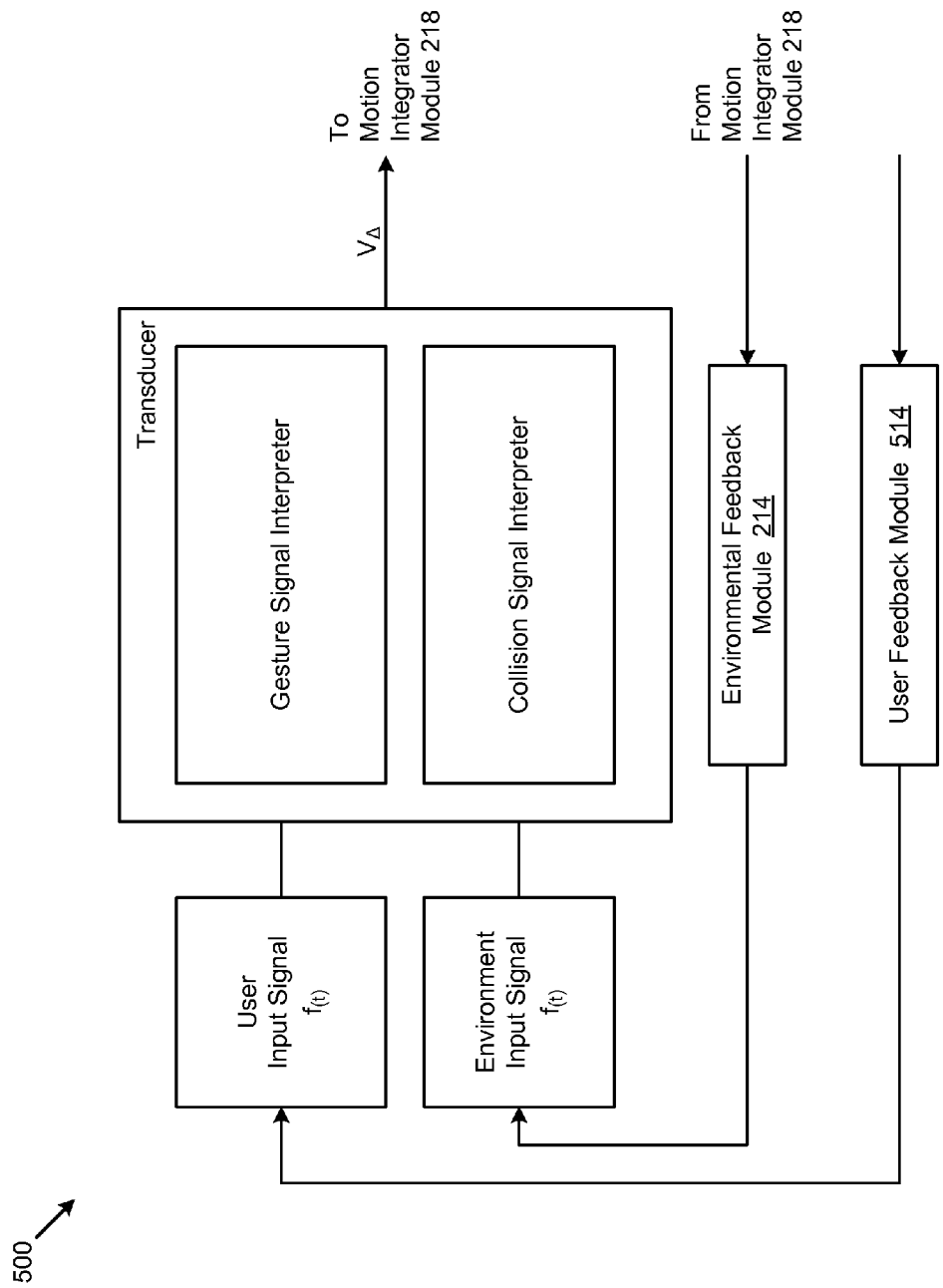
FIG. 5 depicts a block diagram showing a feedback loop within a system for moving an object about a display frame by combining classical mechanics of motion, according to some embodiments.

FIG. 5 depicts block diagram showing a feedback loop within a system for moving an object about a display frame by combining classical mechanics of motion. As an option, the present system 500 may be implemented in the context of the architecture and functionality of the embodiments described herein. Also, the system 500 or any aspect therein may be implemented in any desired environment.

In some situations, embodiments of the motion integrator module 218 produce feedback, which feedback can derive from the environment (e.g., via environmental feedback module 214), or from the user interacting to changes on the screen (e.g., via user feedback module 514). For example, an object might traverse to a bounce periphery (e.g., overshoot) and undergo some particular motions in response (e.g., bounce return to a position near the overshoot). There are a variety of different bounce peripheries that may be encountered and/or simulated. For example, the object might experience an elastic or inelastic collision by impacting a rigid and immovable (simulated) object, resulting in an abrupt reversal of direction, possibly at reduced speed. Alternatively, the object may impact a soft, immovable object that will absorb some or all of the energy of impact. As yet another alternative, the object may encounter a moveable, spring-like object that will temporarily store some or all of the energy of impact and then return it to the object in another direction. Such a spring-like periphery may or may not undergo damping, meaning that some of the energy of impact may be dissipated and not returned to the object. It is important to note that these are merely examples of possible bounce peripheries and that other bounce peripheries do exist. Of course, an object might be subjected to additional user input when the user deems the traversal as "too slow". Additional velocity can be added by the user via additional gesture inputs. Or, an object might collide with another object, or reach a virtual boundary (e.g., the "end" of a virtual film strip). In these and other cases the system 500 serves to process signals from a feedback loop.

As for overshooting and returning, desired motions can be accomplished using models combining classical mechanics of motion. In some such cases, a critically damped spring model is used to model how energy is transduced from abrupt or gradual changes in kinetic motion (e.g., due to a collision or other interaction at the bounce periphery) into kinetic motion in a reversing direction. This is deemed by users as "realistic" because it models a real world scenario of a spring and shock absorber. Furthermore, when combined with the friction model 150 above the motion can be described as a fairly smooth continuous function, even at the moment of impact (e.g., impact with a bound periphery), and even when the object changes direction as a consequence of the impact. The impact acts on the sliding object as though it had hit a shock absorber with a spring. It is a smooth motion, and the motion response is fast without being too abrupt.

Using a critically damped spring means returning to the neutral position as fast as possible without overshooting. Upon impact (e.g., with a bounce periphery) the object decelerates quickly and "naturally" to a momentary stop.

The spring's stiffness and the damping coefficient of the shock absorber can be tuned to adjust how quickly it should come to rest, and how much energy (if any) is returned to the object in the action of the bounce. As another example, when a filmstrip being manipulated under a viewport reaches the end of the roll (e.g., the last individual image at the end of the filmstrip) the filmstrip will behave as though it had caught on a critically damped spring so as to return to the end of the filmstrip roll position as fast as possible while remaining realistic and without overshooting.

One possibility for modeling animation behavior beginning at the point of a collision or other interaction is to include the force from a critically-damped spring term:

$$F_{net} = F_{sliding} + F_{fluid} + F_{spring} \qquad (Eq. 3)$$

In embodiments involving a collision (e.g., a collision with a bounce periphery etc.), the energy of the display object under animation is dissipated by the critically-damped spring. In exemplary cases, the energy of the display object under animation is fully dissipated by the critically-damped spring. In such an exemplary case, as the object overshoots and decelerates, some of the initial energy is dissipated and some is stored in the spring, which then returns the stored energy to the object, accelerating it in the opposite direction. In this exemplary case, the damping continues to dissipate kinetic energy at such a rate that all kinetic energy has been dissipated just as the object returns to the original collision point (or initial interaction point) at the bounce periphery, causing it to smoothly glide to a stop. Accordingly, the display object under animation passes the bounce periphery, and smoothly reverses direction and gradually comes to rest at a point very near the point of collision.

In some cases, an object might be subjected to additional user input when the user deems the traversal as "too slow". Additional velocity can be added by the user via additional gesture input such as an additional flick, or a key stroke, or a mouse click, etc.

It should be recognized that certain gestures include the notion of velocity, and in some cases determining a stable signal (e.g., with noise removed from the signal) can be accomplished by sampling a series of values over a range of time steps, and selecting only some of the previous samples for processing (e.g., for filtering or averaging).

Now, considering the systems shown and described above, a method for achieving realistic animations of an object in motion across a display screen can be practiced by receiving a gesture from a human interface device, then instantaneously accelerating the display object to an initial velocity based on based some aspect of the gesture (e.g., a gentle flick, a sharp flick), and applying an animation to the display object where the animation combines a sliding friction term with a fluid friction term to determine the instantaneous changes in velocity (e.g., changes in distance moved between display frames). In order to cause an aesthetically-pleasing motion while traveling an amount that is useful to the user in terms of showing mostly new content while retaining some overlapping context, after receiving a discrete gesture (such as a click or button press) that does not have an intrinsic magnitude, the initial velocity is calculated so as to impart a virtual energy to the display object such that applying the first animation and the rules governing the loss of said virtual energy will cause the object to come to rest after traveling a distance approximately equal to 85% of the length of the viewport in the direction of motion. Other values besides 85% of the length of the viewport in the direction of motion may alternatively be used In situations where the default traveling distance would cause the object to encounter a bounce periphery, the traveling distance and corresponding energy imparted may or may not be reduced to avoid the collision. In situations where the discrete gesture does intrinsically contain a magnitude, such as a keypress from a keyboard that measures the force and/or speed of each keystroke, the magnitude of the gesture may or may not be taken into account and may or may not play some role in determining the energy imparted to the object.

Of course it is possible than in the course of animation through the traveling distance, the display object collides with another display object. In this and other cases, a second animation (e.g., for colliding/stopping) and a third animation (e.g., for bouncing back) is applied, possibly including forces from a dampened spring (e.g., a critically dampened spring).

The complexity of such animations can increase as the realism increases, thus it is expeditious to define a programming framework so as to ease the burden of programming to achieve the desired animations.

Figure 6:
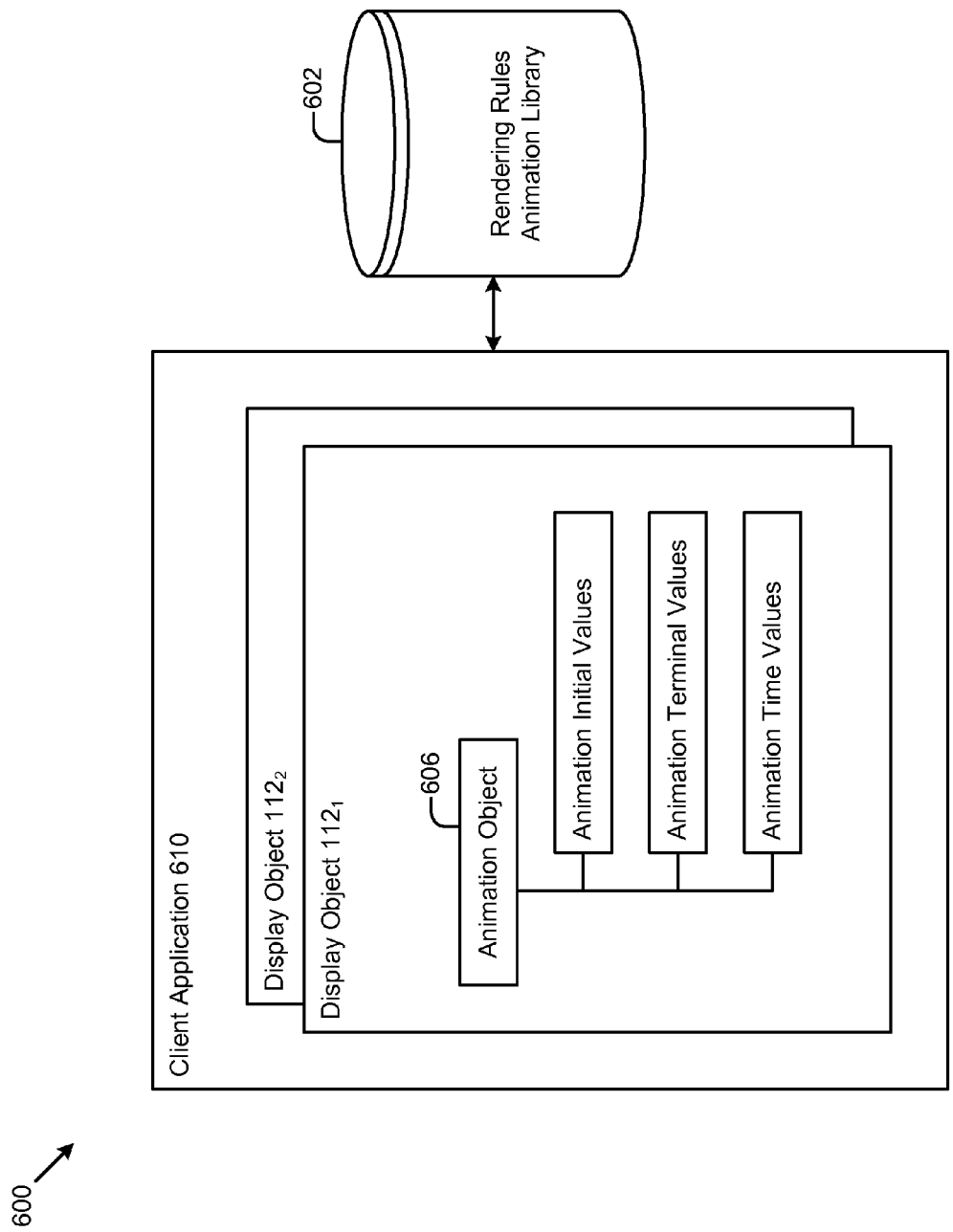
FIG. 6 depicts a block diagram showing an animation framework used in a system for moving an object about a display frame by combining classical mechanics of motion, according to some embodiments.

FIG. 6 depicts a block diagram showing an animation framework used in a system for moving an object about a display frame by combining classical mechanics of motion. As an option, the present system 600 may be implemented in the context of the architecture and functionality of the embodiments described herein. Also, the system 600 or any aspect therein may be implemented in any desired environment.

One convenience for moving an object about a display frame by combining classical mechanics of motion is to provide a library comprising models (e.g., classical mechanics models), impulse motion controls, and various utility functions (e.g., display models, pre-constructed animations, etc.).

Such a convenience becomes more and more impactful as, increasingly, developers are interested in creating web pages and web applications that are highly interactive and have very fluid user interface motion. One of the obstacles to providing the richness of desktop applications is the difficulty in implementing animations using the tools available in javascript. Such difficulties arise due to:

Lack of true threading support in javascript.
Lack of a non-busy "sleep" function.
Code development or platform constraints requiring use of only native javascript and certain versions of CSS (e.g., since those languages are served by most or all browsers).

One solution is to develop an animation framework (including a library) for performing frame-based animations with the herein-disclosed characteristics.

FIG. 6 illustrates such a framework with an animation library 602 comprising models, impulse motion controls, and various utility methods. In an exemplary use of the framework:

The programmer using the library is able to quickly and easily define how to draw a window or other display object (e.g., display object $112_1$, display object $112_2$).

The programmer should be able to quickly and easily associate an animation object with a particular display object, and be able to invoke an animation on a particular display object that is associated with the animation object 606.

The programmer does not have to deal with the specifics of when to render individual frames.

The animations render as smoothly as possible within the limitations of the host machine, yet the animations do not overly consume system resources.

The animation does not slow down the end-user's pace. In one embodiment, the client of the library (e.g., a client application 610) creates an animation object and defines the method doFrame( ). This doFrame( )method will be called during the animation by the library on behalf of the client. The library receives four arguments (e.g., from a client application 610):

Object: Any HTML element that is part of the DOM and has an ID; the main object on which the animation is acting.

$V_O$ and $V_f$: Two numeric constants within the scope of the animation, intended to be used as initial and terminal values.

T: The amount of time into the animation for the frame that is to be rendered, normalized across the interval [0, 1]; the portion of the entire duration of the animation that has elapsed thus far at the time of rendering the frame Further, class libraries can be defined, and an object oriented model can be observed. As an example:

```
ANIM.Animations.fade = new Object( );
ANIM.Animations.fade.doFrame = F(obj, v0, vF, t)
{
    var opacity = v0 + t * (vF - v0);
    obj.style.opacity = opacity;
    obj.style.filter = 'alpha(opacity='+Math.round(opacity*100)+')';
}
```

The client application 610 also has the option of implementing a doEnd( ) method if there is some special action that should be taken at the end of the animation. In this example, the library will check for the existence of this method and call it, if it is defined. It receives two arguments: obj and vF.

To start an animation, the client application simply calls a single method animate.

As an example, and given an object "ANIM":
ANIM.animate(obj, 'fade', 0, 1, 500);

The above example will fade-in the object obj from completely transparent to completely opaque over the course of 500 ms (one half second) by following the rules used by method "animate". In exemplary embodiments, the method "animate" has seven arguments, the last two of which are optional.

Synopsis:
ANIM.animate=
F(obj, animation, v0, vF, duration, delay, callback)
where:
obj=The object being manipulated
animation=The animation to be used (e.g., fade)
V0=Initial value
vF=Terminal value
duration=How long the animation should last
delay=How long to wait before beginning the animation (offered to the client in case he/she wishes to chain together several animations and wants animation n to begin immediately after animation n−1 finishes; if it is not explicitly specified, 0 is assumed, meaning the animation begins as soon as the line of code executes).
callback=An optional string that will be evaluated as if it were javascript code when the animation finishes. This serves a similar purpose to the optional doEnd method. The difference is that this callback applies to the specific invocation of the animation. (e.g., it would apply when fading in one specific page element.). The method doEnd applies to every invocation of the animation. (e.g., doEnd applies whenever anything is faded in or out).

The library provides a set of methods that handle the timing of frames. The animate method is used to start the animation. The core functionality takes advantage of the ability to schedule code and events for future execution using setTimeout( ). The method setTimeout exhibits the feature such that the browser executes the scheduled code roughly when it is scheduled to execute it. However, depending on the browser and on system load, the scheduled code may run later or even earlier than it is scheduled to run.

The library checks the actual time whenever the code is run. The library converts this absolute time to a t-value (e.g., a time value) reflecting how far the animation has progressed from $t_0$ to t-final and then calls the method doFrame. The browser schedules the next frame to be rendered 16 ms after the preceding frame.

A nominal frame interval of 16 ms corresponds to 60 frames per second. That rate corresponds to the maximum refresh rate of most modern (LCD) monitors and is also approximately the limit of what can be perceived by the human eye. Refreshing animations any faster than in 16 ms intervals would cease having any human-perceivable effects.

On slow machines, the next frame may not actually be rendered for more than 16 ms. However, since the library schedules events by time slices, and considers actual time when determining what events to render, the library will render the events that corresponds to when the code actually runs rather than when it was originally scheduled to run. This means the animation will degrade gracefully as system resources become scarce. For example, on a very slow machine, an animation might be slightly "choppy"—due to a low frame rate—but the animation will still complete during the correct, intended total duration. This intelligent dropping of frames is vastly preferable to having an animation render every single frame and therefore last longer than it is supposed to last, which could have the effect of preventing the user from going on with the use of the application.

Sometimes the browser executes code before it is scheduled to run. This could cause the machine to get bogged down because it would be computing many unnecessary frames. For example, the browser might end up computing frames every 1-2 ms when the monitor can only display a frame every 16 ms. The library avoids such an unnecessary system slow-down by keeping track of when the most recent frame was generated and intelligently checking whether it is useful to generate a new frame. If it is not useful to render a frame, the library does not render a frame and instead simply schedules the next frame to render as soon as it would be useful. For example, if a scheduled event occurred only 4 ms after the last frame was rendered, the library would not render a new frame. Instead, the library would schedule the next frame to be rendered in 12 ms, as that makes for a total of 16 ms since the most recent frame was rendered.

Of course, a myriad of animations can be developed and used very quickly and easily, and animations run as smoothly as possible without placing a burden on the machine. Moreover, animations degrade gracefully on older hardware.

Figure 7:
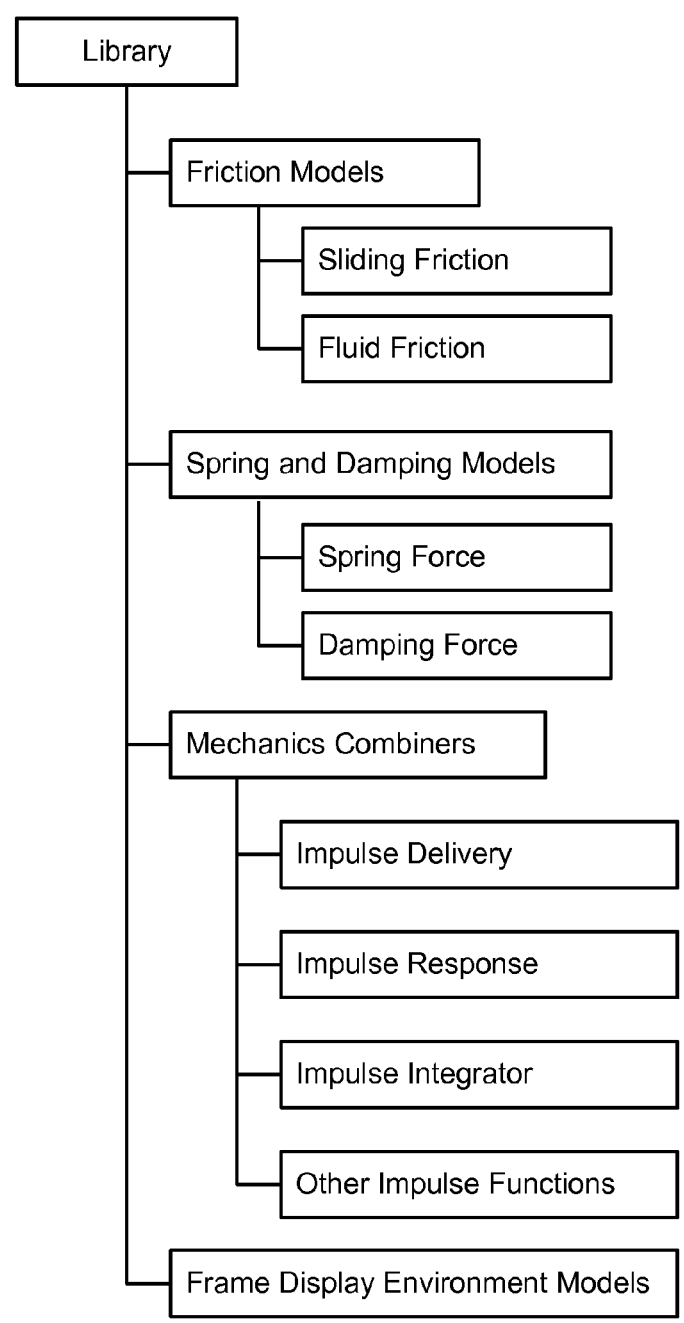
FIG. 7 depicts an organization of a library, according to some embodiments.

FIG. 7 depicts an organization of a library 700. As an option, the present library 700 may be implemented in the context of the architecture and functionality of the embodiments described herein. Also, the library 700 or any operation therein may be implemented in any desired environment.

As shown, the library 700 is organized into a hierarchy comprising friction models, spring and damping models, mechanics combiners, and frame environment models.

Additional Embodiments of the Disclosure

Figure 8:
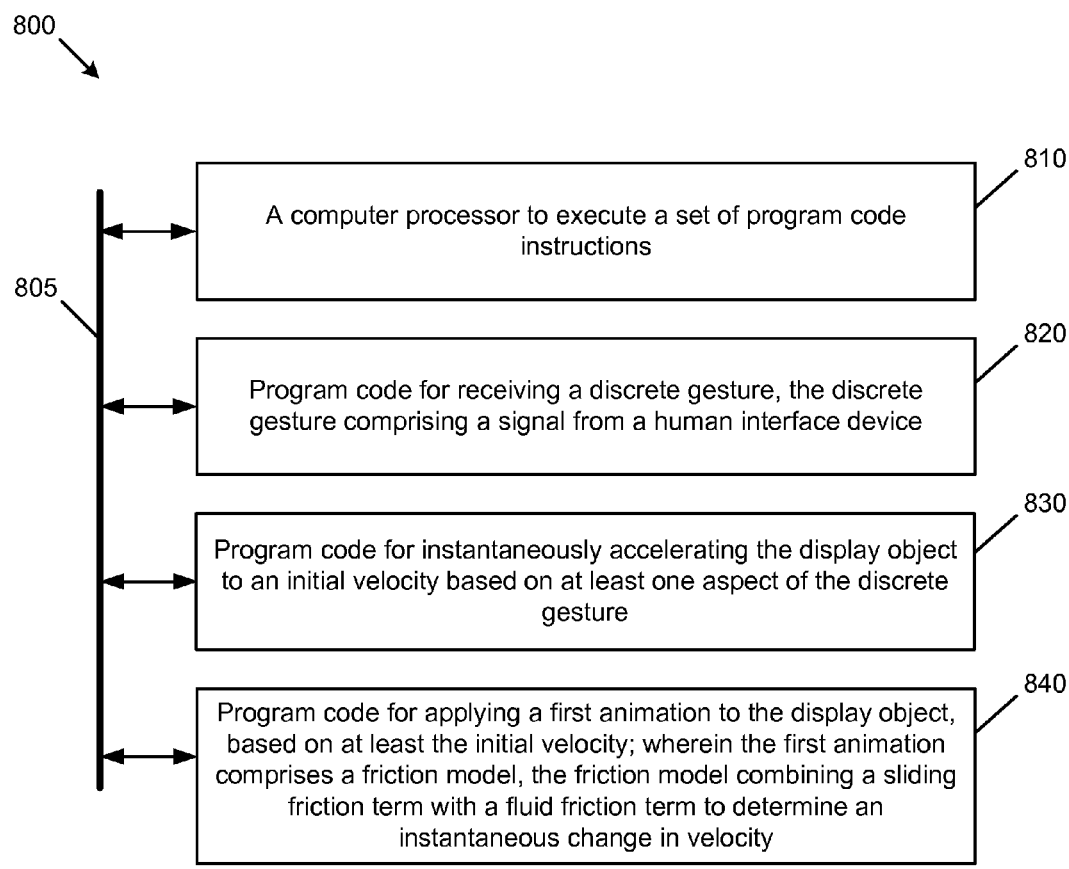
FIG. 8 depicts a block diagram of a system to perform certain functions of a computer system, according to some embodiments.

FIG. 8 depicts a block diagram of a system to perform certain functions of a computer system. As an option, the present system 800 may be implemented in the context of the architecture and functionality of the embodiments described herein. Of course, however, the system 800 or any operation therein may be carried out in any desired environment. As shown, system 800 comprises at least one processor and at least one memory, the memory serving to store program instructions corresponding to the operations of the system. As shown, an operation can be implemented in whole or in part using program instructions accessible by a module. The modules are connected to a communication path 805, and any operation can communicate with other operations over communication path 805. The modules of the system can, individually or in combination, perform method operations within system 800. Any operations performed within system 800 may be performed in any order unless as may be specified in the claims. The embodiment of FIG. 8 implements a portion of a computer system, shown as system 800, comprising a computer processor to execute a set of program code instructions (see module 810) and modules for accessing memory to hold program code instructions to perform: receiving a discrete gesture, the discrete gesture comprising a signal from a human interface device (see module 820); instantaneously accelerating the display object to an initial velocity based on at least one aspect of the discrete gesture (see module 830); applying a first animation to the display object, based on at least the initial velocity wherein the first animation comprises a friction model, the friction model combining a sliding friction term with a fluid friction term to determine the instantaneous change in velocity (see module 840).

Figure 9:
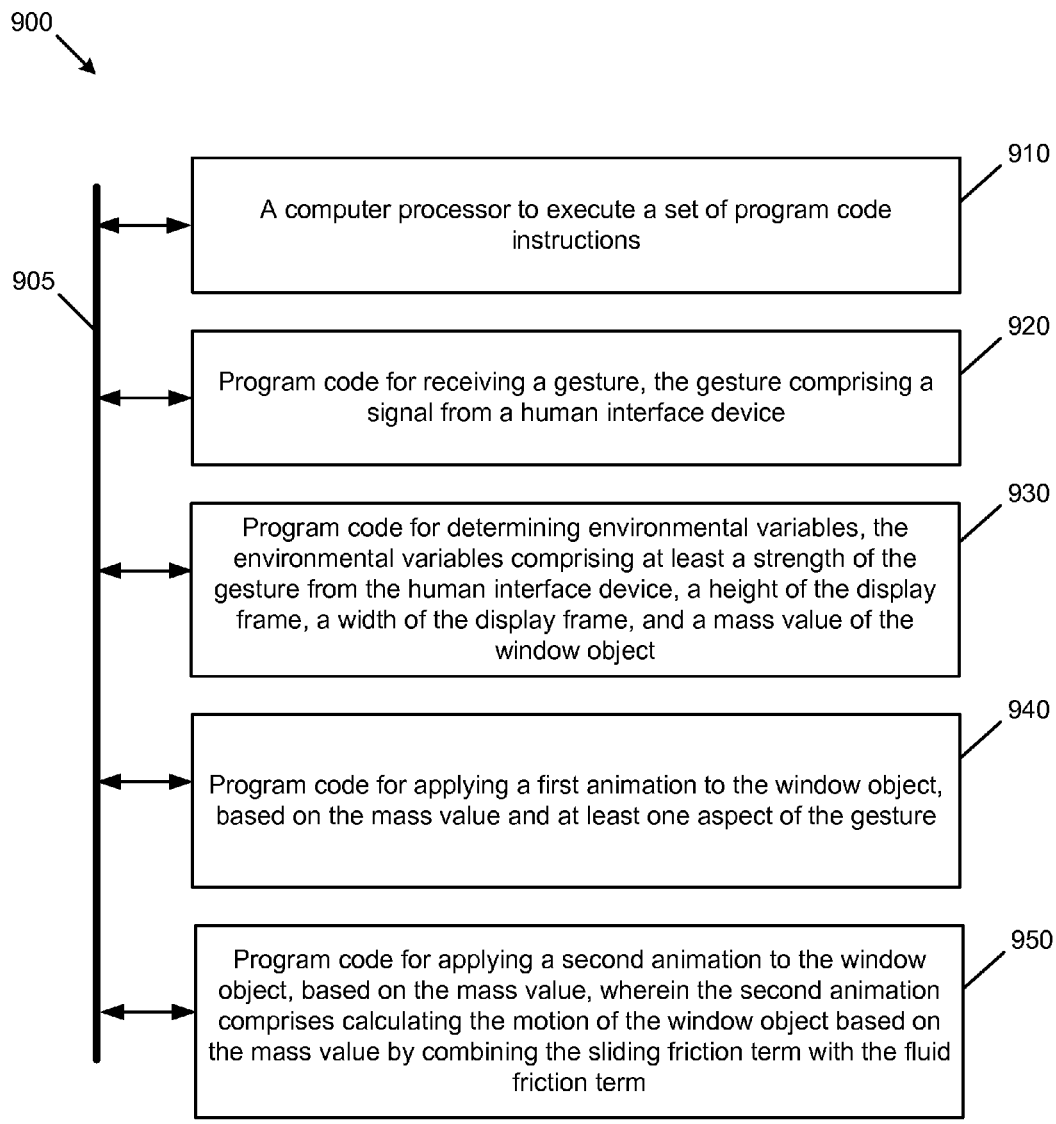
FIG. 9 depicts a block diagram of a system to perform certain functions of a computer system, according to some embodiments.

FIG. 9 depicts a block diagram of a system to perform certain functions of a computer system. As an option, the present system 900 may be implemented in the context of the architecture and functionality of the embodiments described herein. Of course, however, the system 900 or any operation therein may be carried out in any desired environment. As shown, system 900 comprises at least one processor and at least one memory, the memory serving to store program instructions corresponding to the operations of the system. As shown, an operation can be implemented in whole or in part using program instructions accessible by a module. The modules are connected to a communication path 905, and any operation can communicate with other operations over communication path 905. The modules of the system can, individually or in combination, perform method operations within system 900. Any operations performed within system 900 may be performed in any order unless as may be specified in the claims. The embodiment of FIG. 9 implements a portion of a computer system, shown as system 900, comprising a computer processor to execute a set of program code instructions (see module 910) and modules for accessing memory to hold program code instructions to perform: receiving a gesture, the gesture comprising a signal from a human interface device (see module 920); determining environmental variables, the environmental variables comprising at least a strength of the gesture from the human interface device, a height of the display frame, a width of the display frame, and a mass value of the window object (see module 930); applying a first animation to the window object, based on the mass value and at least one aspect of the gesture (see module 940); applying a second animation to the window object, based on the mass value wherein the second animation comprises calculating the motion of the window object based on the mass value by combining the sliding friction term with the fluid friction term (see module 950).

System Architecture Overview

Figure 10:
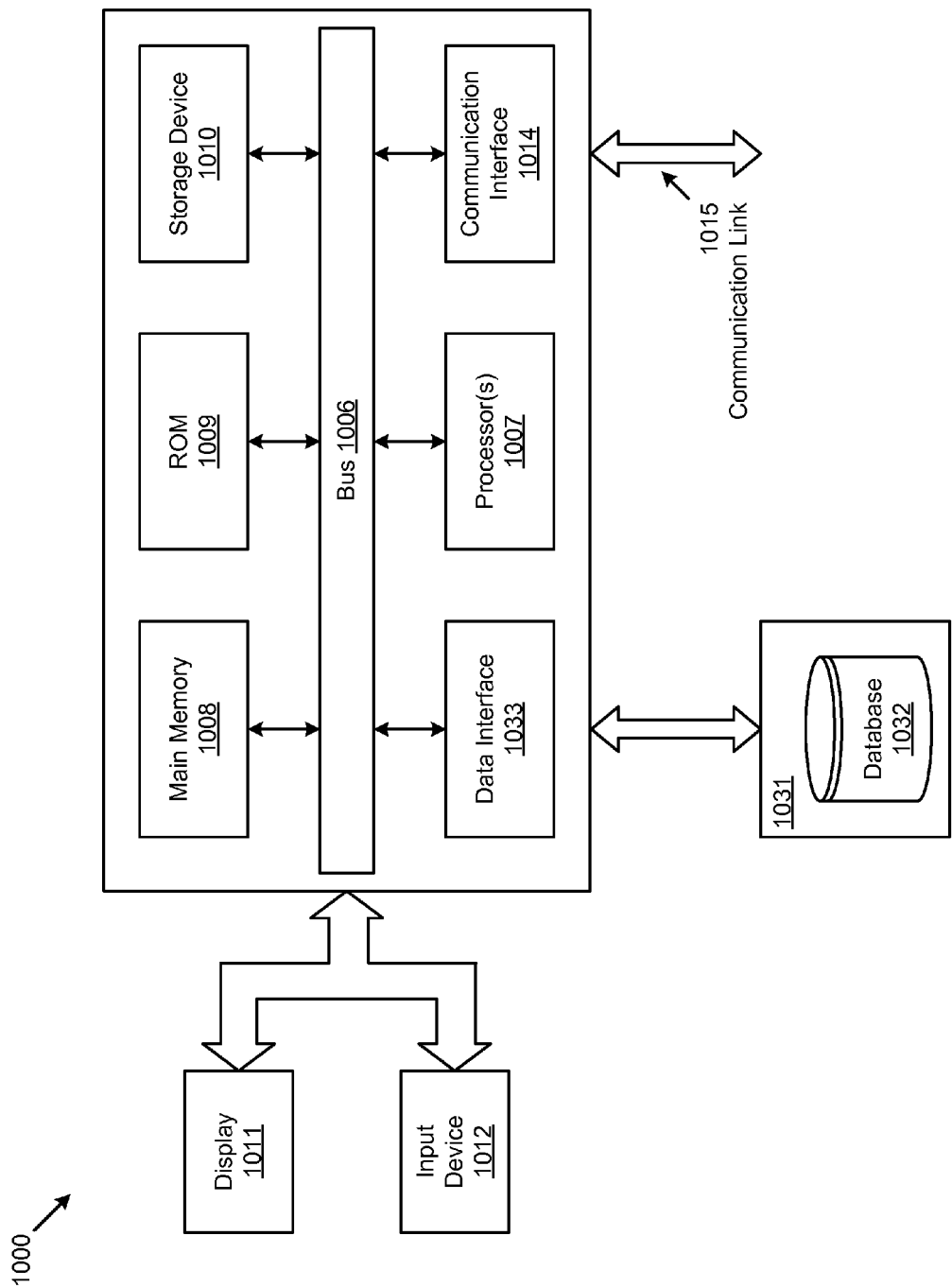
FIG. 10 depicts a block diagram of an instance of a computer system suitable for implementing an embodiment of the present disclosure.

FIG. 10 depicts a block diagram of an instance of a computer system 1000 suitable for implementing an embodiment of the present disclosure. Computer system 1000 includes a bus 1006 or other communication mechanism for communicating information, which interconnects subsystems and devices, such as a processor 1007, a system memory 1008 (e.g., RAM), a static storage device 1009 (e.g., ROM), a disk drive 1010 (e.g., magnetic or optical), a data interface 1033, a communication interface 1014 (e.g., modem or Ethernet card), a display 1011 (e.g., CRT or LCD), input devices 1012 (e.g., keyboard, cursor control), an external data repository 1031, and a database 1032.

According to one embodiment of the disclosure, computer system 1000 performs specific operations by processor 1007 executing one or more sequences of one or more instructions contained in system memory 1008. Such instructions may be read into system memory 1008 from another computer readable/usable medium, such as a static storage device 1009 or a disk drive 1010. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 1007 for execution. Such a medium may take many forms, including but not limited to, non-volatile media and volatile media. Non-volatile media includes, for example, optical or magnetic disks, such as disk drive 1010. Volatile media includes dynamic memory, such as system memory 1008.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 1000. According to other embodiments of the disclosure, two or more computer systems 1000 coupled by a communication link 1015 (e.g., LAN, PTSN, or wireless network) may perform the sequence of instructions required to practice the disclosure in coordination with one another.

Computer system 1000 may transmit and receive messages, data, and instructions, including program, i.e., application code, through communication link 1015 and communication interface 1014. Received program code may be executed by processor 1007 as it is received, and/or stored in disk drive 1010 or other non-volatile storage for later execution. Computer system 1000 may communicate through a data interface 1033 to a database on an external data repository 1031. A module as used herein can be implemented using any mix of any portions of the system memory 1008, and any extent of hard-wired circuitry including hard-wired circuitry embodied as a processor 1007

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than restrictive sense.

What is claimed is:

1. A computer implemented method for moving a display object within a display frame using a discrete gesture, the method comprising:
   receiving a gesture, the gesture comprising a signal from a human interface device;
   accelerating the display object in a display frame to an initial speed in response to the gesture received from the human interface device, the initial speed of the display object in response to a sequence of gestures determined regardless of whether the display object is stationary or is already in motion when multiple gestures in the sequence of gestures are received at the human interface device; and
   identifying a bounce periphery in the display frame;
   identifying a distance between an initial location of the display object and the bounce periphery;
   determining a predetermined travel distance for the display object to travel in response to a gesture in the sequence of gestures based in part or in whole upon the initial location, the distance between the initial location of the display object and the bounce periphery, and a direction of the gesture;
   applying, at a motion integrator module stored at least partially in memory, a first animation to the display object, the first animation illustrating that the display object is accelerated to the initial speed when the gesture is received and travels the predetermined distance when the display object is subsequently dampened to a stop with a friction model before the display object reaches the bounce periphery, wherein
   the friction model is determined based on mechanics of motion and combines a sliding friction term with a fluid friction term, rather than having only the fluid friction term, to determine a change in the initial speed, and
   the fluid friction term dominates at higher speeds, and the sliding friction term dominates at lower speeds of the display object.

2. The method of claim 1, further comprising:
   identifying a first temporal rate of exponential decay for the fluid friction term based in part or in whole upon one or more desired deceleration characteristics of the display object during the first animation;
   identifying a second temporal rate of change for the sliding friction term based in part or in whole upon one or more desired deceleration characteristics of the display object during the first animation;
   determining the fluid friction term by using at least the first temporal rate of exponential decay and the second temporal rate of change;
   determining an energy value and a mass value of the display object by using at least one or more environment variables and the gesture; and
   converting the energy value and the mass value of the display object into the change in the initial speed.

3. The method of claim 1, further comprising:
   receiving a second gesture in the sequence of gestures, the second gesture comprising a second signal from the human interface device;
   applying a second animation to the display object, based on at least one aspect of the second gesture.

4. The method of claim 1, wherein the initial speed imparts a virtual energy to the display object equal to the virtual energy lost by applying the first animation, wherein the gesture corresponds to an intrinsic magnitude that is not accounted for in applying the first animation.

5. The method of claim 1, further comprising:
   receiving an event, the event excluding collision or interaction between the display object and the bounce periphery of the display frame and comprising the collision or the interaction between the display object and a different display object; and
   applying a third animation to the display object, based on at least one aspect of the event.

6. The method of claim 5, wherein the third animation comprises a friction model, the friction model combining the sliding friction term, the fluid friction term, and the damped spring term.

7. The method of claim 1, wherein the display object comprises display content under a viewport or the initial speed is based at least in part upon a size of the display frame.

8. A computer system for moving a display object within a display frame using a gesture, comprising:
   a computer processor to execute a set of program code instructions; and
   a memory to hold the program code instructions, in which the program code instructions comprise program code which, when executed by the computer processor, causes the computer processor to:
   receive a gesture, the gesture comprising a signal from a human interface device;
   accelerate the display object in a display frame to an initial speed in response to the gesture received from the human interface device, the initial speed of the display object in response to a sequence of gestures determined regardless of whether the display object is stationary or is already in motion when multiple gestures in the sequence of gestures are received;
   identify a bounce periphery in the display frame;
   identify a distance between an initial location of the display object and the bounce periphery;
   determine a predetermined travel distance for the display object to travel in response to a gesture in the sequence of gestures based in part or in whole upon the initial location, the distance between the initial location of the display object and the bounce periphery, and a direction of the gesture;
   apply a first animation to the display object, the first animation illustrating that the display object is accelerated to the initial speed when the gesture is received and travels the predetermined distance when the display object is subsequently dampened to a stop with a friction model before the display object reaches the bounce periphery, wherein the friction model is determined based on mechanics of motion and combines a sliding friction term with a fluid friction term, rather than having only the fluid friction term, to determine a change in the initial speed, and the fluid friction term dominates at higher speeds, and the sliding friction term dominates at lower speeds of the display object.

9. The computer system of claim 8, wherein the initial speed is based at least in part upon a size of the display frame.

10. The computer system of claim 8, the memory holding the program code instructions, in which the program code instructions comprise program code which, when executed by the computer processor, further causes the computer processor to:

receive a second gesture in the sequence of gestures, the second gesture comprising a second signal from the human interface device;

apply a second animation to the display object, based on at least one aspect of the second gesture.

11. The computer system of claim 8, wherein the fluid friction term dominates at the higher speeds, and the sliding friction term dominates at the lower speeds of the display object in that percent contribution from the fluid friction term to the friction model is relatively higher at higher speeds, and the percent contribution from the sliding friction term to the friction model is relatively lower at lower speeds of the display object during the first animation.

12. The computer system of claim 8, the memory holding the program code instructions, in which the program code instructions comprise program code which, when executed by the computer processor, further causes the computer processor to:

receive an event, the event excluding collision or interaction between the display object and a bounce periphery of the display frame and comprising the collision or the interaction between the display object and a different display object; and apply a third animation to the display object, based on at least one aspect of the event.

13. The computer system of claim 12, wherein the third animation comprises a friction model, the friction model combining the sliding friction term, the fluid friction term, and a damped spring term.

14. The computer system of claim 8, wherein the display object comprises display content under a viewport.

15. A computer program product embodied in a non-transitory computer readable medium, the computer readable medium having stored thereon a sequence of instructions which, when executed by a processor causes the processor to execute a method to implement moving a display object within a display frame using a gesture, the method comprising:

receiving a gesture, the gesture comprising a signal from a human interface device;

accelerating the display object in a display frame to an initial speed, the initial speed of the display object in response to a sequence of gestures determined regardless of whether the display object is stationary or is already in motion when multiple gestures in the sequence of gestures are received; and identifying a bounce periphery in the display frame;

identifying a distance between an initial location of the display object and the bounce periphery;

determining a predetermined travel distance for the display object to travel in response to a gesture in the sequence of gestures based in part or in whole upon the initial location, the distance between the initial location of the display object and the bounce periphery, and a direction of the gesture;

applying a first animation to the display object, the first animation illustrating that the display object is accelerated to the initial speed when the gesture is received and travels the predetermined distance when the display object is subsequently dampened to a stop with a friction model before the display object reaches the bounce periphery, wherein the friction model is determined based on mechanics of motion and combines a sliding friction term with a fluid friction term, rather than having only the fluid friction term, to determine a change in the initial speed, and the fluid friction term dominates at higher speeds, and the sliding friction term dominates at lower speeds of the display object.

16. The computer program product of claim 15, wherein the initial speed is based at least in part upon a size of the display frame.

17. The computer program product of claim 15, in which the sequence of instructions, when executed by the processor, further causes the processor to execute the method by:

receiving a second gesture in the sequence of gestures, the second gesture comprising a second signal from the human interface device;

applying a second animation to the display object, based on at least one aspect of the second gesture.

18. The computer program product of claim 15, wherein the initial speed imparts a virtual energy to the display object equal to the virtual energy lost by applying the first animation, wherein the gesture corresponds to an intrinsic magnitude that is not accounted for in applying the first animation.

19. The computer program product of claim 15, in which the sequence of instructions, when executed by the processor, further causes the processor to execute the method by:

receiving an event, the event excluding a collision or interaction between the display object and the bounce periphery of the display frame and comprising the collision or the interaction between the display object and a different display object; and applying a third animation to the display object, based on at least one aspect of the event.

20. The computer program product of claim 19, wherein the third animation comprises the friction model, the friction model combining the sliding friction term, the fluid friction term, and a damped spring term.

* * * * *

UNITED STATES PATENT AND TRADEMARK OFFICE
CERTIFICATE OF CORRECTION

PATENT NO. : 9,448,633 B2
APPLICATION NO. : 13/460425
DATED : September 20, 2016
INVENTOR(S) : Rodgers Page 1 of 1

It is certified that error appears in the above-identified patent and that said Letters Patent is hereby corrected as shown below:

On the Title Page

Column 2, under Abstract, Line 6, after "based" insert -- on --.

In the Specification

In Column 7, Line 42, delete "$F_{flui}$" and insert -- $F_{fluid}$ --, therefor.

In Column 7, Line 45, delete "$(k_{fluid}vV+F_{normal}k_{sliding}sign(v))$" and insert -- $(k_{fluid}v + F_{normal}k_{sliding}sign(v))$ --, therefor.

In Column 8, Line 50, delete "the of" and insert -- the --, therefor.

In Column 15, Line 19, after "frame" insert -- . --.

In Column 16, Line 16, delete "t-final" and insert -- $t_{final}$ --, therefor.

In Column 19, Line 6, after "1007" insert -- . --.

Signed and Sealed this
Twenty-third Day of May, 2017

Michelle K. Lee
*Director of the United States Patent and Trademark Office*